Figure 1:
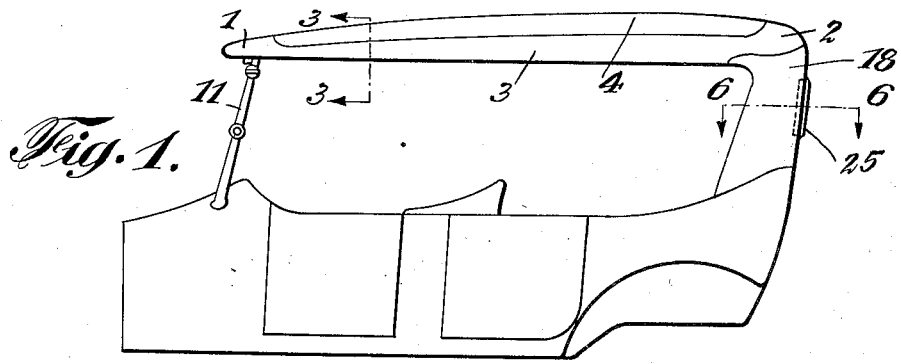

Oct. 23, 1928.

L. I. HEINTZ 1,688,867

TOP FOR AUTOMOBILE BODIES

Filed Sept. 15, 1923  4 Sheets-Sheet 1

INVENTOR
Leo I. Heintz
BY
J. R. Edmonds
ATTORNEY

Oct. 23, 1928.
L. I. HEINTZ
1,688,867
TOP FOR AUTOMOBILE BODIES
Filed Sept. 15, 1923     4 Sheets-Sheet 2
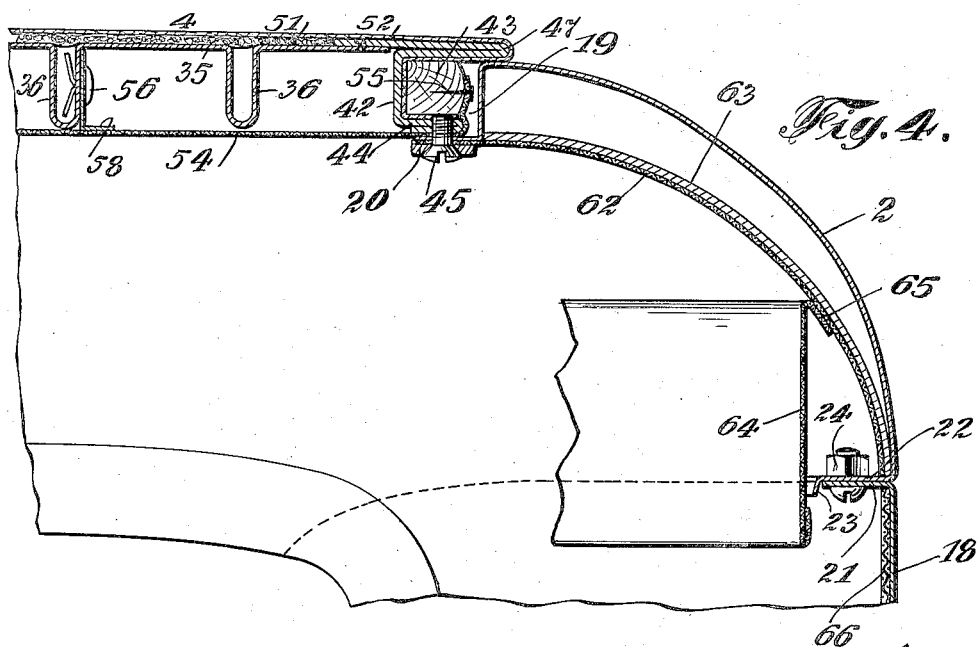
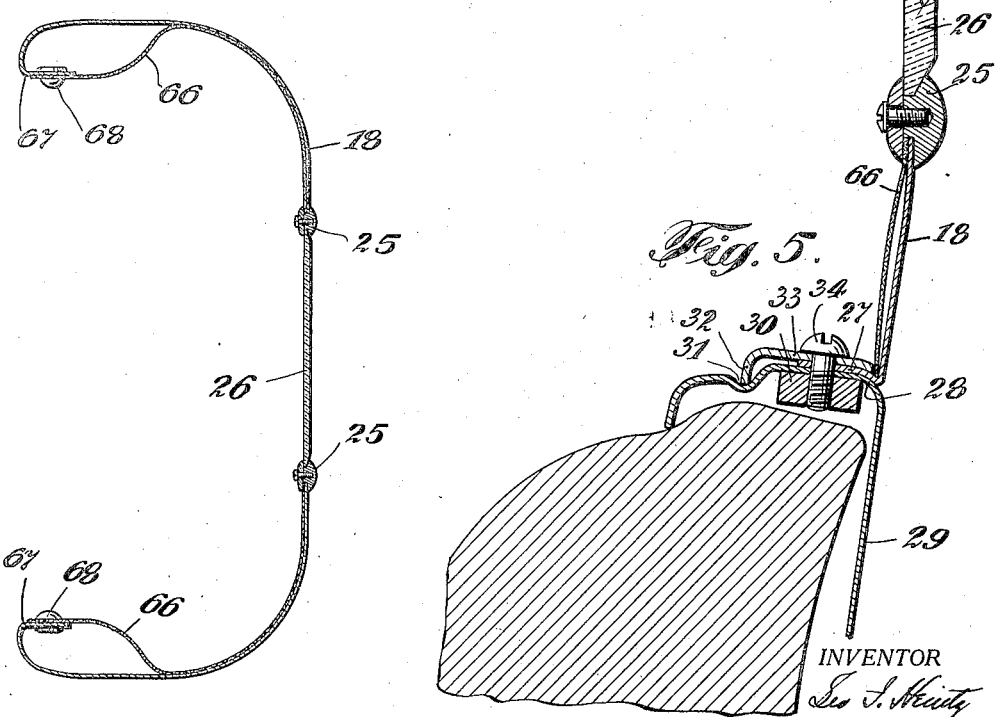
INVENTOR
BY
ATTORNEY

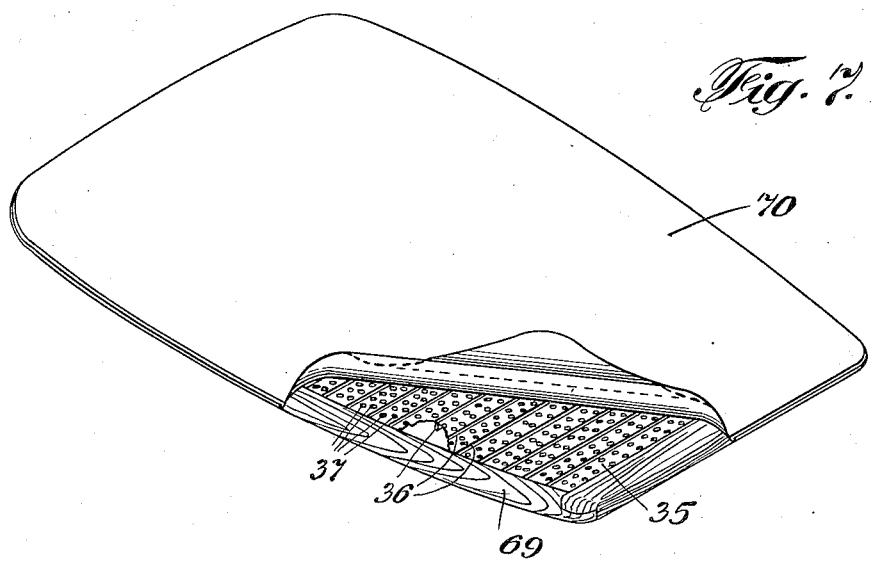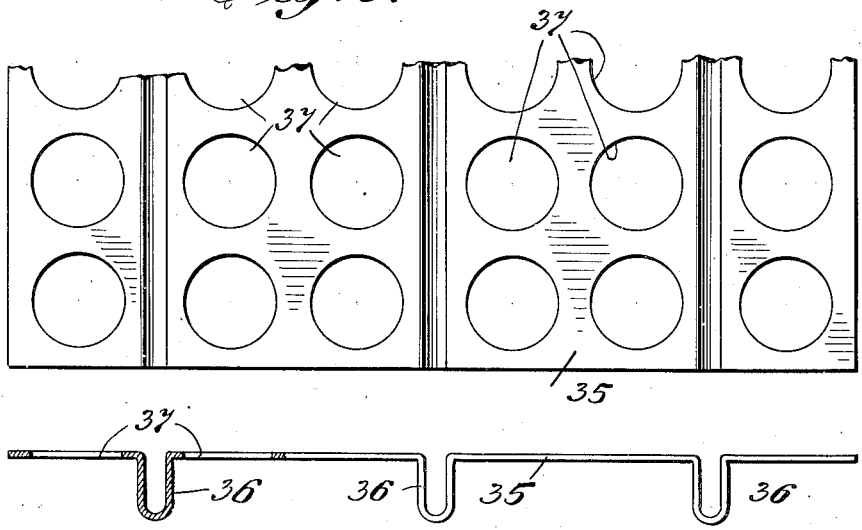

Oct. 23, 1928.  
L. I. HEINTZ  
1,688,867  
TOP FOR AUTOMOBILE BODIES  
Filed Sept. 15, 1923     4 Sheets-Sheet 4
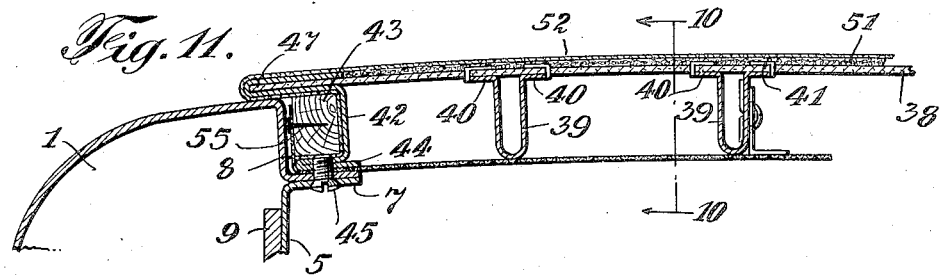
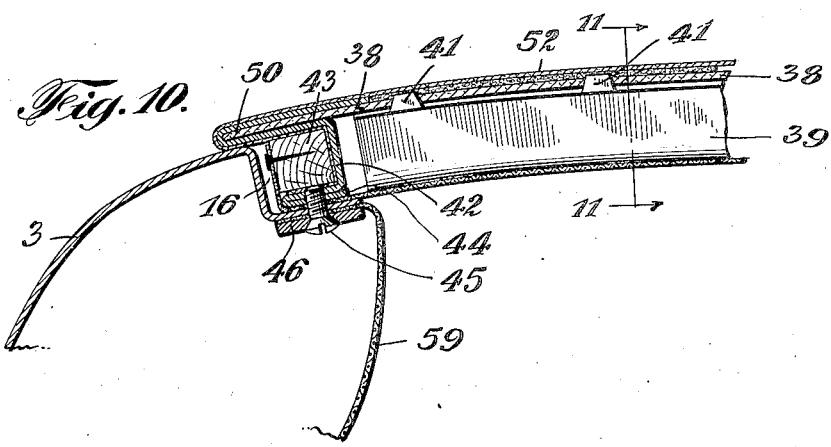
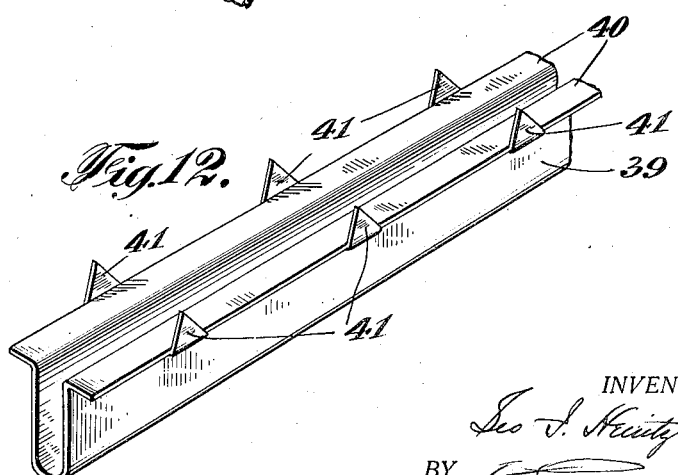
INVENTOR  
*Leo I. Heintz*  
BY  
*J. R. Edmonds*  
ATTORNEY Patented Oct. 23, 1928.

1,688,867

UNITED STATES PATENT OFFICE.

LEO I. HEINTZ, OF PHILADELPHIA, PENNSYLVANIA, ASSIGNOR TO HEINTZ MANUFACTURING COMPANY, OF PHILADELPHIA, PENNSYLVANIA, A CORPORATION OF PENNSYLVANIA.

TOP FOR AUTOMOBILE BODIES.

Application filed September 15, 1923. Serial No. 662,823.

This invention relates to tops for automobile bodies, and more particularly relates to the construction and mounting of vehicle body tops which are demountable but which cannot be folded up.

The principal aim of my invention is to provide a demountable top for vehicle bodies which is of strong, durable and light construction, and one which is not top-heavy and one which will not rumble. Further objects of my invention include the provision of a vehicle top which has strong marginal rails and a light center portion. A further object of my invention is to provide a demountable top including a demountable rear curtain portion, and to provide simple and efficient means for demountably securing and supporting the rear curtain portion on the body; for demountably securing and supporting the frame portion on the body and rear curtain portion; and for demountably securing and supporting the central top portion on the frame. Other objects of my invention will be in part obvious and in part pointed out hereinafter.

In accordance with my invention, the top comprises a frame adapted to be demountably supported on a vehicle body; a central insert portion adapted to be demountably supported on said frame; a rear curtain portion adapted to be demountably supported by the rear panel of a vehicle body and to demountably support the rear portion of the frame; and means for demountably securing the several parts together and for demountably attaching the top to the vehicle body. The invention accordingly consists in the features of construction, combinations of elements and arrangements of parts which will be exemplified in the construction hereinafter set forth and the scope of the application of which will be indicated in the following claims.

Figure 2:
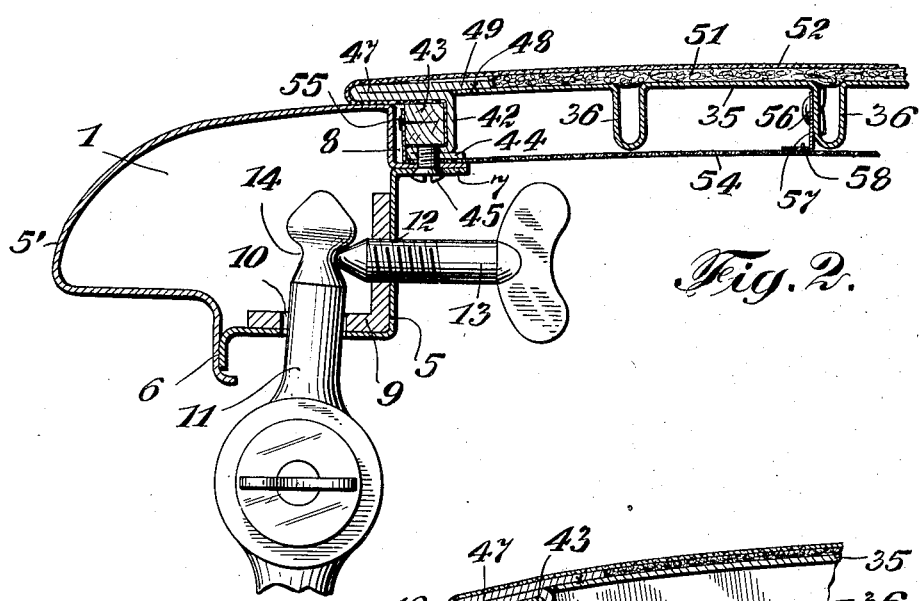
Figure 3:
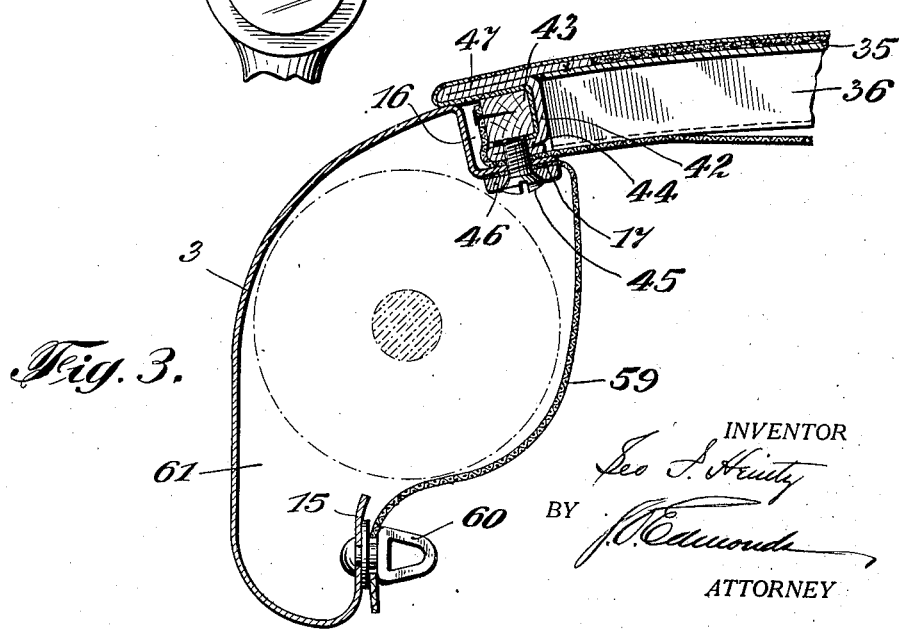

In order that a clearer understanding of my invention may be had, attention is hereby directed to the accompanying drawings forming a part of this application and illustrating certain possible embodiments of my invention. Referring to the drawings, Fig. 1 is a diagrammatic side view of a vehicle body including a top embodying my invention; Fig. 2 is a sectional view through a portion of the front of the top, showing one manner of mounting the top on a windshield stanchion of the body; Fig. 3 is a sectional view of a fragment of a side portion of the top and is taken on the line 3—3 of Fig. 1; Fig. 4 is a sectional view through a fragment of the rear portion of the top, showing a portion of the upper edge of a rear curtain member; Fig. 5 is a sectional view of a fragment of the rear portion of the body, showing the manner of connecting the lower portion of the rear curtain member thereto; Fig. 6 is a horizontal sectional view of the rear curtain member and is taken on the line 6—6 of Fig. 1; Fig. 7 is a perspective view of a modified form of top, certain parts being displaced and others broken away in order to more clearly illustrate the construction; Fig. 8 is a top plan view of a metallic panel adapted for use in a top embodying my invention; Fig. 9 is an end view, partly in section, of said metallic panel; Figs. 10 and 11 are, respectively, sectional views on different vertical planes, of a modified form of top construction; and Fig. 12 is a perspective view of a portion of a rib shown in Figs. 10 and 11. Similar reference characters refer to similar parts throughout the several views of the drawings.

Referring to the drawings, the top comprises a frame, including front portion 1, rear portion 2 and side portions 3, and a central panel portion 4. The front frame portion 1 is box shaped, comprising two suitably shaped sheets of metal, 5 and 5', which have abutting flanges welded or otherwise secured together, as at 6 and 7. The flanges 7 of parts 5 and 5' extend horizontally and inwardly forming a rabbeted portion 8 along the upper and inner edge of frame portion 1. Member 5 is preferably angle shaped and reenforced by angle iron 9. These members are suitably perforated, as at 10, to permit the upper ends of windshield stanchions 11 to be extended therethrough, and are provided with threaded perforations 12 adapted to receive bolts or thumb screws 13 which may be manually adjusted into and out of engagement with the recessed upper ends 14 of stanchions 11, and whereby the front of the top may be demountably attached to and supported by the vehicle body at the stanchions 11.

Each of the side frame portions 3 of the frame comprises a suitably shaped sheet of metal formed with a lower channel, forming return flange 15, and with a rabbeted portion 16 along its upper and inner edge, this portion including a supporting flange 17.

The rear of the frame comprises a sheet metal frame portion 2 and a rear curtain or panel portion 18 which may be either integral with or separate and demountably attachable to portion 2. In either case the portion 2 is shaped to extend upwardly and inwardly from the curtain portion 18 and has a rabbeted portion 19, including a horizontal flange 20, along its upper edge. When the curtain portion 18 is a separate part from portion 2, its upper edge is formed into an inwardly extending horizontal flange 21 and the lower edge of portion 2 is formed with an abutting flange 22, the end of which is bent downwardly, as at 23, and which determines and insures the proper registration and alignment of the portions 2 and 18 at the joint. The parts 2 and 18 are preferably demountably attached together by means of bolts 24 extended through suitable perforations in the flanges 21 and 22. The curtain or panel member 18 is preferably constructed of sheet metal, and may be provided with one or more window openings bounded by conventional frames, such as 25, for window glass 26. The lower edge of member 18 has a flange 27 which is adapted to fit and to rest upon the top portion 28 of the rear panel 29 of the body in such a way that the body portions of members 18 and 29 are in the desired vertical alignment. A reenforcing strip 30 extends beneath parts 27 and 28. Part 28 is provided with a registering groove or depression 31 in which engages depending fingers or flange 32 of a clamping member 33 which extends rearwardly to a position adjacent to the body of panel 18 and fits snugly upon the top of flange 27. Reenforcing strip 30 has suitable threaded holes in alignment with perforations in the clamp member 33 and parts 27 and 28, so that, by means of screws 34, the flange 27 of the rear curtain portion 18 may be securely and tightly clamped between the clamp 33 and the top 28 of the rear body panel 29. Exact and permanent registration and alignment of the parts are had by reason of the engagement of finger 32 in registering groove 31, this also causing clamp 33 to act as a lever when screws 34 are adjusted, thus increasing the clamping force and preventing displacement of the parts by weaving or otherwise. Obviously when parts 2 and 18 are constructed in one piece the joint at flanges 21 and 22 is eliminated.

In combination with the top frame above described I provide a central panel portion adapted to be demountably mounted thereon to cover the opening bounded by the frame. Such central panel may comprise any suitable material of sufficient weather resisting or shading quality, and may be attached to the frame by any suitable or convenient means. In the modifications illustrated in the drawings I have shown central panel portions of sheet metal, both perforate and imperforate, and a central panel portion of non-metallic material, such as buckram.

When a sheet metal panel 35 is provided it may be formed with a plurality of integral, transversely extending, U-shaped ribs 36 which give added rigidity and strength to the panel. The body of the panel may be perforated, as at 37, to lighten the panel. When a buckram panel, such as 38, is provided, this may be reenforced and braced by means of separate, U-shaped, sheet-metal ribs 39 which may have horizontal flanges 40 adapted to lie against the sheet, and may have prongs 41 which pierce the sheet and are bent over to hold the ribs and sheet together.

I provide means for demountably securing any of these central panels to the frame. To this end I bind the panel, 35 or 38, with metallic channel members 42 which are open outwardly and are adapted to seat in the rabbeted portions 8, 16 and 19 of the frame. Reenforcing strips, 43, preferably of wood, are seated in the channels. The lower walls 44 of the channel members 42 are doubled and are adapted to seat upon frame flanges 7, 17 and 20. These folded lower walls 44 of the channel members 42 have suitable threaded apertures, and the seats 7, 17 and 20 have apertures in alignment therewith, so that the insert panel 35 or 38 may be secured tightly and firmly, but demountably, to the frame by means of screws 45 engaged in these perforations. If desired, reenforcing strips 46 may be provided to parallel flanges 7, 17 and 20. The upper walls of the channel portions 42 are doubled, and extend outwardly, as at 47, so as to overlap the frame beyond and above the rabbeted portions 8, 16 and 19, whereby, when the insert panel 35 or 38 is secured to the frame by means of screws 45, these overlapping portions 47 will be tightly clamped against the top of the frame.

A sheet metal central panel 35 may be secured by welding, as at 48, or by other means, to inwardly extending portions 49 of the channel members 42. For a buckram or similar panel 38 the doubled top wall 47 of the channel members 42 may be opened to provide suitable grooves or channels 50 in which the edges of the panel 38 may be seated and held.

If it is desired to provide a fabric cover over a central panel, this may be readily accomplished by means of suitable material, such as a layer of cotton 51 and a cover 52 of leather or other suitable material. The cover 52 may be attached in place by being brought around the edges of the panel and engaged behind the reenforcing strips 43, whereby the cover is secured in place. If desired, head lining 54 may be brought up against the outer faces of strips 43 and tacked thereto, as at 55. The head-lining, if desired, may also be secured to intermediate portions of the metallic ribs 36 or 39 by means of paper clips or split rivets 56 which pin tabs 57 to the ribs, the tabs 57 being stitched or otherwise secured to the lining, as at 58.

Lining material, such as 59, may also be provided along the inside of side frame portions 15. Such lining may be secured in position at the top by means of screws 45, and at the bottom may be secured to the upwardly extending return flange 15 of frame portion 3 by means of conventional curtain fasteners 60 or by other means. This construction provides a storage space, as at 61, for side curtains for the body.

The rear frame portion 2 of the top may be provided with suitable head-lining 62, reenforced, if desired, by a strip of buckram or similar material 63. The upper edge of lining 62 may be secured in place by means of screws 45, and the lower edge may be secured in place by pasting or tacking to the buckram lining 63 or by other suitable means. If it is desired to conceal the joint between flanges 21 and 22, a strip of lining or other suitable material 64 may be stitched, as at 65, to the head lining 62 so as to be disposed in front of the joint, thus concealing the same from view. Strip 64 is not used if the joint at flanges 21 and 22 is eliminated by reason of members 2 and 18 being in one piece.

The rear curtain portion or panel 18 may also be provided with suitable lining 66 which may be secured along its side edges to return flanges 67 along the side edges of member 18 by means of glove fasteners 68 or other suitable means. Lining or upholstery strip 66 may also be held by coming behind clamp 33 and by engaging at the window frame 25.

From the above, the manner of mounting and demounting the top will be readily apparent. An insert panel 35, 38 may be secured to and detached from the frame by merely adjusting screws 45. The insert is held firmly and tightly in position with a close weathertight seal where the portions 47 overlap the frame portions. On account of the rounded edges of portions 47, the leather or other cover will not be cut. The frame portion is readily mountable and demountable upon the vehicle body by manipulating screws 13 and 34, and the rear curtain portion 18, if provided separate from rear frame portion 2, is readily attachable and detachable therefrom by manipulating bolts 24.

It is to be understood that the central roof panels 35, 38 are not limited for use to the specific frame construction above described, but may be used in a variety of other surroundings. For instance, the roof sheet may be secured permanently and directly to frame members, such as 69, and a suitable cover 70 may be stretched over this combination. Such construction is specially desirable for a permanent top.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In a top of the character described, a front frame member comprising a light gauge sheet metal portion having transverse curvature and along its lower edge being flanged horizontally and then vertically, and along its top being flanged vertically and then horizontally, and a second light gauge sheet metal portion angle shaped in cross section, and having a flange along its lower edge abutting and secured to the said vertical flange which is at the lower edge of the first portion, and secured along its upper edge to the said horizontal flange which is at the upper edge of the first portion.

2. In a top of the character described, a front frame member comprising a light gauge sheet metal portion having transverse curvature and along its lower edge being flanged horizontally and then vertically, and along its top being flanged vertically and then horizontally, and a second light gauge sheet metal portion angle shaped in cross section, and having a flange along its lower edge abutting and secured to the said vertical flange which is at the lower edge of the first portion, and secured along its upper edge to the said horizontal flange which is at the upper edge of the first portion, and a reenforcing and stiffening angle iron seated in the angle of said angular member and secured thereto.

3. In a top of the character described, a front frame member comprising a light gauge sheet metal portion having transverse curvature and along its lower edge being flanged horizontally and then vertically, and along its top being flanged vertically and then horizontally, and a second light gauge sheet metal portion angle shaped in cross section, and having a flange along its lower edge abutting and secured to the said vertical flange which is at the lower edge of the first portion, and secured along its upper edge to the said horizontal flange which is at the upper edge of the first portion, and a reenforcing and stiffening angle iron seated in the angle of said angular member and secured thereto, windshield stanchions extending through perforations in the second member and the angle iron, and screws carried on said member and iron adapted to be engaged with said stanchions to hold the frame member in place thereon.

4. In a top of the character described, a frame having a large central aperture, a central panel including a reenforced and stiffened rigid plate, substantially the size of the aperture, the edges of said panel carrying a channel portion with the channel open outwardly, one leg of said channel overlapping and secured to said frame.

5. In a top of the character described, a frame having a large central aperture a central panel including a reenforced and stiffened rigid plate, substantially the size of the aperture, the edges of said panel carrying a channel portion with the channel open outwardly, the upper wall of said channel being folded double and extending forwardly sufficiently to overlap the frame of the top and having one thickness overlapping and secured to said plate.

6. In a top of the character described, a frame having a large central aperture, a central panel including a reenforced and stiffened rigid plate, substantially the size of the aperture, the edges of said panel carrying a channel portion with the channel open outwardly, and a filling strip seated in said channel.

7. In a top of the character described, a frame having a large central aperture, a central panel including a reenforced and stiffened rigid plate, substantially the size of the aperture, the edges of said panel carrying a channel portion with the channel open outwardly, a filling strip seated in said channel, and a cover extending over said plate and the upper wall of said channel member and clamped in the channel behind said filling strip.

8. In a top of the character described, a frame having a large central aperture, a central panel including a reenforced and stiffened rigid plate, substantially the size of the aperture, the edges of said panel carrying a channel portion with the channel open outwardly, and a filling strip seated in said channel, and head lining extending beneath said plate and secured at its edges to said filling strip.

9. In a top of the character described, a frame having a large central aperture, a central panel including a reenforced and stiffened rigid plate, substantially the size of the aperture, the edges of said panel carrying a channel portion with the channel open outwardly, said frame comprising sheet metal and having an accentuated reenforcing and stiffening flange about its lower edge and having a reenforcing and stiffening flange about its upper edge forming an attachment portion for said central panel.

10. In a top of the character described, a frame having a large central aperture, a central panel including a reenforced and stiffened rigid plate, substantially the size of the aperture, the edges of said panel carrying a channel portion with the channel open outwardly, said frame comprising sheet metal and having transverse curvature and having a rabbetted portion about its upper edge a leg of said channel seating on and secured to said rabbetted portion.

11. In a top of the character described, in combination, a rigid rectangular frame having a large central opening and comprising front, rear and side members comprising transversely curved sheet metal plates, formed to have along their top edges a substantially vertical web adjacent the opening and a substantially horizontal ledge extending from the web and to have reenforcing flanges along their lower edges, and a light central panel, covering said frame opening and laterally interlocking with the frame, said panel having a marginal flanged formation seating on said ledge and having a marginal fold overlapping the top of said frame.

12. In a top of the character described, in combination, a rigid rectangular frame having a large central opening and comprising front, rear and side members comprising transversely curved sheet metal plates, formed to have along their top edges a substantially vertical web adjacent the opening and a substantially horizontal ledge extending from the web and to have reenforcing flanges along their lower edges, a light central panel, covering said frame opening and laterally interlocking with the frame, said panel having a marginal flanged formation seating on said ledge and having a marginal fold overlapping the top of said frame, and means penetrating said ledge for permanently securing the central panel in place on said frame.

This specification signed this 11th day of September, 1923.

LEO I. HEINTZ.